United States Patent
Mueller et al.

(10) Patent No.: US 7,740,452 B2
(45) Date of Patent: Jun. 22, 2010

(54) HIGHLY EXTENSIBLE POWER AND/OR SIGNAL TRANSMISSION CABLE AS WELL AS ROTOR BLADE WITH SUCH A CABLE

(75) Inventors: Christine Mueller, Munich (DE); Dieter Preissler, Hohenbrunn (DE)

(73) Assignee: Eurocopter Deutschland GmbH, Donauworth (DE)

( * ) Notice: Subject to any disclaimer, the term of this patent is extended or adjusted under 35 U.S.C. 154(b) by 740 days.

(21) Appl. No.: 11/612,618

(22) Filed: Dec. 19, 2006

(65) Prior Publication Data
US 2007/0264124 A1     Nov. 15, 2007

(30) Foreign Application Priority Data
Dec. 23, 2005    (DE)  ............... 10 2005 062 347

(51) Int. Cl.
*B63H 1/26* (2006.01)
(52) U.S. Cl. .................. 416/226; 416/230; 416/241 A
(58) Field of Classification Search .......... 416/226, 416/230, 241 A
See application file for complete search history.

(56) References Cited
U.S. PATENT DOCUMENTS

| | | | | |
|---|---|---|---|---|
| 3,291,898 A * | 12/1966 | Sandell | ............... | 174/131 R |
| 4,079,903 A * | 3/1978 | Ashton et al. | ............... | 416/226 |
| 4,080,543 A * | 3/1978 | Takahashi et al. | ........... | 310/213 |
| 4,265,981 A * | 5/1981 | Campbell | .................. | 428/591 |
| 4,970,352 A * | 11/1990 | Satoh | .................... | 174/106 R |
| 5,212,350 A * | 5/1993 | Gebs | .................... | 174/102 R |
| 6,457,943 B1 * | 10/2002 | Olsen et al. | ................. | 416/230 |

* cited by examiner

*Primary Examiner*—Igor Kershteyn
(74) *Attorney, Agent, or Firm*—Young & Thompson

(57) ABSTRACT

A fiber-composite rotor blade, especially of a rotary-wing aircraft, with a predefined rotor blade profile that has a predefined outer contour of the profile. The fiber-composite rotor blade includes a fiber-composite rotor blade structure having an upper and a lower cover skin and a profile core situated between them, and at least one highly extensible cable integrated into the fiber-composite rotor blade structure in the direction of the span of the rotor blade, whereby the cable can be connected to a functional device that can be attached onto or into the fiber-composite rotor blade structure. The cable is a highly extensible power and/or signal transmission cable that includes at least one cable strand with at least one first cable core made of an electrically insulating, elastic plastic material, and at least one first cable wire that is wound around the first cable core at a predefined pitch angle, like a spiral and free of crossovers.

31 Claims, 3 Drawing Sheets

HIGHLY EXTENSIBLE POWER AND/OR SIGNAL TRANSMISSION CABLE AS WELL AS ROTOR BLADE WITH SUCH A CABLE

Priority is claimed to German Patent Application No. 10 2005 062 347.6, filed on Dec. 23, 2005, the entire disclosure of which is incorporated by reference herein.

The present invention relates to a power and/or signal transmission cable as well as to a rotor blade, especially a rotor blade of a rotary-wing aircraft, having such a cable.

BACKGROUND

Rotor blades made of fiber-composite materials are used especially in rotors of modern rotary-wing aircraft such as, for example, helicopters, because of their special suitability for high, alternating dynamic and aerodynamic loads. In recent times, such rotor blades have been increasingly equipped with special functional devices that make it possible, for example, to systematically influence the aerodynamic and acoustic properties of a rotor. These functional devices can be, for example, actuators for an adjustable rotor blade flap arranged near the tip of the rotor blade, sensors installed on the rotor blade, a heating unit in the rotor blade, or the like. Especially well-suited actuators for adjustable rotor blade flaps are piezoelectric actuators that are actuated or controlled electrically. Power and signal transmission cables are required to supply power to such functional devices or else for signal or data transmission. Starting from an interface on the side of the rotor head or from a blade connection area of the rotor blade, these cables often have to extend over a large part of the span of the rotor blade all the way to the functional device (and sometimes back again as well).

During rotor operation, the rotor blades are subjected to extreme stresses and strains due to the enormous centrifugal forces of up to about 1000 grams or more. Moreover, the rotor blades are severely deformed by alternating dynamic and aerodynamic forces during a rotation of the rotor blade. During a rotation of the rotor blade, the rotor blades execute flapping, tilting and twisting movements that lead to a bending and twisting of the fiber-composite rotor blade structure. If the rotor blade is equipped with power and signal transmission cables, it has been found that, under the described high dynamic loads, the wires or conductors of the cable very quickly break or fail. Especially electric signal or power transmission cables having metal wires or conductors fail quite soon. Consequently, sufficient fatigue strength of the cable can no longer be ensured. The result of this, in turn, is that it is not possible to ensure reliable operation of the appertaining functional device that is being supplied with power by such a cable or that receives or emits signals via such a cable. Moreover, if the cable fails, the appertaining rotor blade in which this cable is installed has to be replaced or repaired. This, however, entails tremendous technical effort and costs.

In the case of certain applications or cable designs, for example, coaxial cables or the like, it is also necessary for the wires/conductors of the cable to be shielded. However, it has been found that the shielding of these cables also fails too soon as a result of the above-mentioned high centrifugal forces so that reliable shielding cannot be ensured.

The installation of power and/or signal transmission cables in the rotor blade is also very complex. Up until now, conventional cables of the above-mentioned type have been laid in cable conduits that are created on the surface in the fiber-composite rotor blade structure and in the predefined rotor blade profile. For this purpose, the cable is glued into the cable conduit and the conduit is covered, sealed with filler paste and the filler paste is subsequently ground so that the contour matches the predefined outer contour of the profile of the rotor blade. This matching of the contour is of special importance since the rotor blade profile is an aerodynamically effective profile over essentially the entire span of the rotor blade and any deviation from a predefined target outer contour of the profile has a detrimental effect on the aerodynamic properties of the rotor blade. If the cable that has been installed in this manner fails, the filler paste has to be cut away and removed, while making sure that the load-bearing fiber-composite rotor blade structure is not damaged in this process. Consequently, repeated installation of a cable in and dismantling of a cable from a fiber-composite rotor blade is extremely complex and is associated with a great deal of production and assembly work as well as considerable costs. Therefore, it would be desirable if it were possible to could reduce the installation and dismantling work for the cable.

SUMMARY OF THE INVENTION

An object of the present invention is to improve the fatigue strength and long-term transmission properties of cables that are exposed to high mechanical or dynamic stress especially due to strains, particularly in rotors subjected to centrifugal forces.

The present invention provides a highly extensible power and/or signal transmission cable including at least one cable strand with
- at least one first cable core made of an electrically insulating, elastic plastic material; and
- at least one first cable wire that is wound around the first cable core (4) at a predefined pitch angle, like a spiral and free of crossovers.

This highly extensible power and/or signal transmission cable has at least one cable strand with at least one first cable core made of an electrically insulating, elastic plastic material, and at least one first cable wire that is wound around the first cable core at a predefined pitch angle, like a spiral and free of crossovers.

A cable wire as set forth in the invention is also a conductor. If the cable according to the invention has several cable wires, then these are likewise wound around the first cable core, like a spiral and free of crossovers. This means that neither the windings of one single wire nor the windings of all of the wires cross over each other. In a manner of speaking, the cable wires are only "cabled". If several cable wires are present in one wire strand, these cable wires are arranged next to each other. Although several cable wires that form a joint wire strand can be layered on top of each other, as a rule, this is only preferred in exceptional cases. The at least one cable wire is preferably wound onto the first cable core loosely and without pre-tensioning.

The first cable core can be configured either as a solid profile or as a hollow profile. The first cable core preferably has a round or rounded-off cross section so that the at least one cable wire wound around the cable core does not become kinked or notched, which could have a negative impact on the fatigue strength. When it comes to the configuration of the first cable core and its arrangement in the cable, a distinction can be made between essentially three cases:

1) The first cable core is soft and, in the ideal case, infinitely soft. In case of a positive strain or lengthening of the cable, the cable core is constricted and the at least one first cable wire can lengthen, like a spiral on and with the cable core. In this variant, the cable wire can also be wound onto the first cable core relatively taut and with a slight pre-tensioning.

2) The first cable core is stiff and, in the ideal case, infinitely stiff. In case of a positive strain or lengthening of the cable, the cable core is not constricted and the at least one first cable wire can slide on the cable core, so that the distance between consecutive windings of the winding changes. In this variant, the first cable wire is preferably wound onto the first cable core loosely and without pre-tensioning.

3) Exceptional case: with a cable according to the invention that is laminated or glued into a fiber-composite component, the first cable core is subsequently removed. This can be done, for example, by pulling or stripping it (also using a thermal or chemical technique). The spiral-like structure of the at least one first wire that was previously wound onto the cable core is left in place. In case of a positive strain or lengthening of the cable, the first cable wire can become elongated like a spiral.

The inventors have recognized that, in the case of cables exposed to high mechanical or dynamic stress especially due to strains, particularly if they are permanently installed in a component that is subjected to high centrifugal forces such as a rotor blade, the cable wires cannot adequately and durably follow the extreme strains that occur in the component and consequently they fail too soon.

With the cable according to the invention, however, thanks to its being wound like a spiral and free of crossovers, the cable wires or the at least one first cable wire can pull apart like a spiral spring on and/or together with the first cable core in case of a positive strain (lengthening) of the cable. This also works when the cable is firmly laminated or glued into a fiber-composite component since it can follow even the extreme strains that occur in the fiber-composite component. Since the pitch angle of the winding is relatively small and thus the local lengthwise direction of the wound first cable wire runs almost perpendicular to the strain direction or at a relatively large angle ranging from 45° to almost 90°, the first cable wire is hardly or only very slightly extended, even in case of a large strain on the entire cable. Consequently, the at least one first cable wire, in conjunction with the spiral-spring effect described above, can durably follow an extremely large strain of the cable, without the occurrence of fatigue fractures. Moreover, since the first cable wire is also wound free of crossovers, when the cable is extended, abrasion of adjacent windings of the wound first cable wires is effectively avoided (in contrast, a winding in which the wires cross over each other would quickly abrade at the crossover points and thus fail very soon). This positive effect is especially pronounced if the at least one first cable wire is made of a metal material, for example, of copper or a copper alloy.

Since the first cable core is made of an elastic plastic material, it can likewise accommodate high strains of the cable durably and without premature failure, and in this process, it can concurrently serve as a guide and support for the at least one first cable wire.

Consequently, thanks to the solution according to the invention, the fatigue strength properties, the reverse fatigue strength properties as well as the power and signal transmission properties of cables that are exposed to high mechanical or dynamic stress due to strains, can be substantially improved. Therefore, especially in rotors subjected to centrifugal forces, a reliable and long-lasting energy and power transmission to and from functional devices arranged in a rotor blade can be ensured. Owing to these positive properties of the cable according to the invention, in at least one embodiment, the cable can also be permanently integrated or laminated into the rotor blade and, as a result, can certainly reach a service life that matches that of the rotor blade. Consequently, the cable does not have to be replaced as often or not at all, so that demanding dismantling work can be largely eliminated. Moreover, due to the fact that the cable according to the invention can be better integrated into the rotor blade or into its fiber-composite structure, not only is the production of a rotor blade equipped with a power and/or signal transmission cable simplified but it is also possible to more simply and more effectively achieve a precise and smooth—and hence aerodynamically favorable—outer contour of the rotor blade profile.

According to a preferred and advantageous embodiment of the cable according to the invention, the cable is configured as a coaxial cable and it has at least a second hollow, electrically insulating cable core that sheathes the at least one first cable wire, and at least a second cable wire is provided that is wound around the second cable core at a predefined pitch angle, free of crossovers. The properties of the second cable core essentially match those of the first cable core, which applies to the statements above as well as to those below. By the same token, the properties of the at least one second cable wire essentially match those of said first cable wire. The windings of the first and second cable wires can run in the same direction or in the opposite direction with respect to each other. The second cable wire can serve, for example, as shielding for the first cable wire or else it can transmit the power and/or signals itself in the manner of a two-pole or multi-pole cable. Preferably, the cable according to the invention can also be configured as a flat cable with several cable strands that lie next to each other and/or on top of each other. Such a cable can be integrated into a rotor blade profile especially advantageously since the latter is very flat itself and only offers a small installation space for cables.

In another embodiment, the cable according to the invention can have an outer, electrically insulating insulation layer that surrounds or covers the at least one first and/or second cable wire. In the case of the above-mentioned coaxial cable, the second cable core can also function as an insulation layer. Like the first or second cable wire, the insulation layer also has to be able to follow the strains of the cable and it likewise has to ensure that the first or second wire that is wound like a spiral can be extended or can move sufficiently freely on or along with the first or second cable, like a spiral spring. If the cable is provided for installation in a fiber-composite component or in the fiber-composite structure of a rotor blade, then the extensibility of the material of the insulation layer has to be at least as high as that of the fiber-composite material in order to attain the same fatigue strength of the cable. Of course, this likewise applies to the first and second cable cores.

Moreover, it is preferred for the cable according to the invention to have several cable strands that comprise at least the first cable core and at least the first cable wire, and that are arranged on at least one strip-like, elastic support layer. Two support layers are also possible, that is to say, a sandwich-like support layer structure between which the above-mentioned components are arranged. The cable strands preferably follow an essentially straight path on the support layer or layers. By the same token, however, it is possible to lay the cable strands in a meander-like or wavy pattern. As far as the extensibility and the fatigue strength of the at least one support layer are concerned, the same applies as stated for the first and second cable cores and for the insulation layer. The support layer facilitates the production of flat cable structures and also offers a large adhesion or contact surface for laminating the cable according to the invention into a fiber-composite structure.

The support layer can concurrently also form the outer insulation layer of the at least one first or second cable wire and can thus perform multiple functions.

The material of the first and/or second cable core is preferably a material that is selected from a group of materials comprising a thermoplastic, especially polytetrafluoroethylene (PTFE), ethylene-tetrafluoroethylene (ETFE), polyurethane (PUR), silicone; an elastomeric material, including a thermoplastic elastomeric material, including elastomeric blends, especially natural rubber or butadiene rubber; a foam, an electrically non-conductive fiber-composite material, especially a fiberglass-composite material. These materials ensure a sufficiently high extensibility as well as fatigue strength of the first or second cable core and, at the same time, ensure that the first or second cable wire can be attached to the cable core in the manner described above and that it is capable of lengthening or moving together with an extension/lengthening of the cable core, like a spiral spring.

The at least one first and/or second cable wire is preferably a cable wire that is selected from a group of cable wires comprising an electrically conductive wire, especially a wire made of a metal material, especially a copper material; a fiber-optical wire, especially a fiberglass wire; a hybrid wire structure that has electrically conductive wire constituents as well as fiber-optical wire constituents, especially arranged next to each other.

According to another preferred embodiment of the invention, the first or second cable core has a modulus of elasticity that lies in a range from 200 to 1600 N/mm$^2$, especially 350 to 1500 N/mm$^2$, especially 375 to 1000 N/mm$^2$, especially 400 to 700 N/mm$^2$, especially to 550 N/mm$^2$. This leads to an elastic extensibility of the cable core in question that has proven to be especially advantageous for the intended use of the cable according to the invention under very high strains due to centrifugal forces.

Moreover, the first or second cable core preferably has a Shore hardness according to ISO 868 that lies in a range from D30 to D90, especially D35 to D70, especially D40 to D60, especially D45 to D58 and that is especially about D55.

The first or second cable core preferably has a Poisson ratio that lies in the range from 0.3 to 0.5, especially 0.35 to 0.45, especially 0.38 to 0.42, and is especially approximately 0.4.

In at least one embodiment of the invention, in the case of the cable according to the invention, the at least one first or second cable wire is wound loosely around the first or second cable core. Thus, the appertaining cable wire can more easily extend together with the cable core or can slide on the cable core like a spiral spring when the cable core is extended.

In another embodiment of the cable according to the invention, a compressible rubber-elastic layer is arranged on the first and/or second cable core around which the at least one first or second cable wire is wound free of crossovers with a predefined slight pre-tensioning that is generated by the restoring force of the layer. In case of a positive strain or lengthening of the cable, this layer is constricted and the at least first or second cable wire can lengthen like a spiral on and with the cable core and with its appertaining cable core, without this having a negative impact on the fatigue strength of the first or second cable wire.

By the same token, within the scope of the invention, in one embodiment, an intermediate space can be provided between two consecutive windings of the at least one first or second cable wire in the lengthwise direction of the cable. As a result, the spiral spring-like extension/lengthening of the appertaining cable wire can be systematically influenced and the intermediate space can be utilized for other elements.

Thus, for example, in yet another embodiment of the cable according to the invention, said intermediate space is filled with a rubber-elastic filling material. This can serve, for example, to maintain a precise spacing between consecutive windings on the winding, to effectuate a guiding function and optionally also a restoring function in the case of the spiral spring-like extension/lengthening of the appertaining cable wire in the lengthwise direction of the cable, or else to avoid excessive abrasion of consecutive windings.

If electric power or an electric signal is to be transmitted by means of the cable according to the invention, in order to improve the electric conductivity, the intermediate space can also be filled with a liquid or pasty electrically conductive medium.

On the basis of yet another embodiment of the cable according to the invention, the ratio of d to D between the diameter d of the first or second wire and the outer diameter D of the first or second cable core lies in a range from 1:50 to 1:3, especially 1:30 to 1:5, especially 1:20 to 1:10. This ratio not only avoids excessively tight winding radii and thus the risk of a break of the cable wire in question, but it also ensures that the first or second cable wire can appropriately lengthen or move like a spiral spring on or along with the cable core in question.

Since the cable according to the invention is supposed to be suited for installation into fiber-composite components whose matrix resins are thermally cured as a rule, in at least one embodiment, the cable according to the invention has to have a sufficient temperature resistance or heat deflection temperature. Therefore, the first or second cable core preferably has a melting temperature or glass transition temperature (e.g. approximately 327° C. [620.6° F.] for a PTFE cable core) that is higher than the curing temperature of a thermally curable matrix resin of a fiber-composite material, especially of a thermally curable epoxy resin. Since most matrix resins of a fiber-composite material are cured at about 135° C. or at about 180° C. [275° F. or 356° F.], depending on the resin system employed, as a rule, the material of the cable core in question has to be able to withstand these temperatures for about 10 hours without excessive softening or dimensional changes during the production of the fiber-composite component into which the cable is integrated. For the rest, the same applies as stated for the insulation layer or support layer of the cable according to the invention.

The present invention also provides a fiber-composite rotor blade, especially of a rotary-wing aircraft, with a predefined rotor blade profile that has a predefined outer contour of the profile.

This fiber-composite rotor blade, especially of a rotary-wing aircraft, with a predefined rotor blade profile that has a predefined outer contour of the profile comprises a fiber-composite rotor blade structure having an upper and a lower cover skin and a profile core situated between them, and at least one highly extensible cable integrated into the fiber-composite rotor blade structure in the direction of the span of the rotor blade, whereby said cable can be connected to a functional device that can be attached onto or into the fiber-composite rotor blade structure.

A cover skin within the scope of the invention is any load-bearing skin that is crucial for the strength, especially for the flexural strength, torsional strength and compressive strength of the rotor blade, such as, for example, the so-called torsion skin, as well as load-bearing fiber-composite layers joined thereto (especially in the front third of the rotor blade profile cross section) as well as any non-load-bearing skin.

With the rotor blade according to the invention, essentially the same advantages can be achieved that were already explained above in conjunction with the cable according to the invention.

In a preferred embodiment of the rotor blade according to the invention, the reversible, maximum permissible extensibility $\epsilon_L$ of the cable in its lengthwise direction at least matches the reversible extensibility $\epsilon_{FC}$ of the fiber-composite (FC) material of the rotor blade in the direction of its span under a maximum centrifugal force $F_{Cmax}$ that is predefined by the specific dimensioning, that is to say, $\epsilon_L \geq \epsilon_{FC}$. This maximum centrifugal force is normally in a range from about 0 to 1500 grams, especially 0 to 1200 grams, especially 0 to 1000 grams, especially 0 to 800 grams, especially 0 to 700 grams. $\epsilon_{FC}$ lies approximately in the order of magnitude of 3% for a fiber-composite helicopter rotor blade. Accordingly, in this case, the following should apply: $\epsilon_L \geq 3\%$. In this manner, essentially the same fatigue strength or reverse fatigue strength can be achieved for the cable as for the rotor blade itself.

In at least one preferred embodiment of the rotor blade according to the invention, the rotor blade profile has a cable conduit that extends mainly in the direction of the span of the rotor blade, that is accessible from the outside of the profile and that forms part of the fiber-composite rotor blade structure, and the cable can be affixed in said conduit. The cable conduit can have partial areas, especially in the vicinity of a functional unit, to which the cable has to be connected and these partial areas also extend in the profile depth direction or at an oblique angle thereto. The cable conduit is especially well-suited for rotor blade configurations in which, when necessary, the cable should be easier to remove again from the rotor blade, easier to inspect, or else easier to integrate into the rotor blade during a later work step, independently of the production of the rotor blade.

Preferably, the rotor blade according to the invention also has a closure element with which the cable conduit can be closed flush with the outer contour of the profile. This ensures a simpler closing or opening of the cable conduit and, at this place of the rotor blade profile, also provides an aerodynamically favorable outer contour in a relatively simple manner.

Preferably, the closure element is one that is selected from a group of closure elements comprising a cover; a cover flap; a filling compound, especially a fiber-composite filling compound, a thermosetting filling compound, a thermoplastic filling compound, an elastomeric filling compound, a filling compound configured as a filler paste, a filling compound configured as an adhesive that, at the same time, constitutes a fastening means for affixing the cable in the cable conduit, a meltable filling compound whose melting temperature is lower than the curing temperature of a matrix resin of the fiber-composite material of the rotor blade; a foam material, especially a foam material that has a protective skin that follows the outer contour of the rotor blade profile and that is to be arranged flush with said rotor blade profile. With such a closure element, it is possible to ensure a secure closure of the cable conduit, even under very high centrifugal forces, as well as an aerodynamically favorable outer contour of the profile in the area of the cable conduit.

In another preferred embodiment of the rotor blade according to the invention, the cover skin is multi-layered and the cable is laminated between two cover skin layers. With this variant, the cable can already be integrated into the fiber-composite structure when the rotor blade is being produced.

Preferably, the cable here is arranged on the inside of the cover skin facing the profile core. Since, as a rule, fiber-composite rotor blades have to be produced in negative molds, a process during which the fiber-composite layers of the cover skin are first built up or laminated in the negative mold, the cable can easily be laminated or glued from the inside onto the already previously laminated fiber-composite layers of the cover skin, even still during the lamination procedure. This not only simplifies the integration of the cable into the rotor blade structure, but also does not give rise to any changes or need for reworking of the outer contour, which is important for the aerodynamics of the rotor blade.

Moreover, it is preferred for the side of the cable facing the profile core to be covered by a fiber-composite cover layer that is joined to the inside of the cover skin. In this manner, the cable is essentially fully integrated into the fiber-composite structure of the cover skin or of the rotor blade profile, it is securely held and can absorb high centrifugal forces.

According to the present invention, it is also possible to fasten the cable to the fiber-composite rotor blade structure and/or to the closure element by means of an adhesive. An adhesive used here is preferably one that is selected from a group of bonding agents comprising an adhesive, especially a double-sided tape; an elastomeric adhesive, especially silicone. This variant is especially well-suited for attaching the cable in a cable conduit of the rotor blade. It has been found that the adhesive can effectively and permanently follow the high strains of the fiber-composite structure of the rotor blade, reliably securing the cable.

Preferably, the cable is laid essentially in a straight line in the direction of the span of the rotor blade. Hence, the cable extends essentially parallel to the direction of the centrifugal forces that occur on the rotor blade and, owing to the above-mentioned structure of the cable according to the invention, it is very well-suited to durably follow the strain of the fiber-composite rotor blade.

In at least one other embodiment of the invention, the cable can also be laid in a meander-like or wavy pattern extending in the direction of the span of the rotor blade. In certain cases, this arrangement can contribute to increasing the fatigue strength and reverse fatigue strength of the cable.

BRIEF DESCRIPTION OF THE DRAWINGS

Preferred embodiments of the invention with additional configuration details and other advantages will be described in greater detail and explained below, making reference to the accompanying drawings. The following is shown.

DETAILED DESCRIPTION OF PREFERRED EMBODIMENTS

Figure 1:
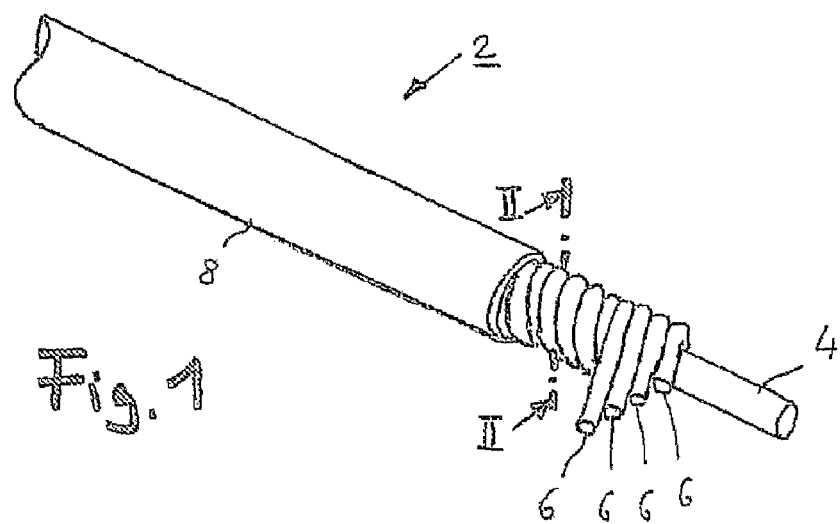
FIG. 1 a schematic perspective view of a cable according to the invention in a first embodiment.

In the following description and in the figures, in order to avoid repetitions, the same components and parts will be designated with the same reference numerals as long as no further differentiation is necessary or practical.

Figure 2:
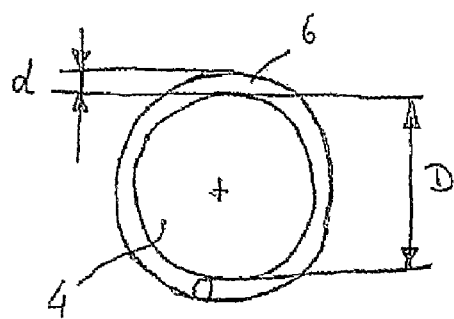
FIG. 2 a schematic, enlarged sectional view through the cable according to the invention along the lines II-II in FIG. 1.

FIG. 1 shows a schematic perspective view of a highly extensible power transmission cable 2 (hereinafter referred to in short as cable 2) according to the invention in a first embodiment. FIG. 2 shows a schematic, enlarged sectional view through the cable 2 according to the invention along the line II-II in FIG. 1.

In this example, the cable 2 comprises a single cable strand with a first cable core 4 made of an electrically insulating, elastic plastic material and four first cable wires 6 that are wound loosely around the first cable core 4 at a predefined pitch angle, like a spiral and free of crossovers. The cable wires 6 are configured as electric conductors and are made of a copper material. The cable 2 has an outer, electrically insulating insulation layer 8 that sheathes the four first cable wires 6.

The first cable core 4 is made of polytetrafluoroethylene (PTFE). The modulus of elasticity is 420 N/mm². The Shore hardness according to ISO 868 is D55. The Poisson ratio of the first cable core 4 is approximately 0.4. The melting temperature or glass transition temperature of the first PTFE cable core 4 is approximately 327° C. [620.6° F.] and is higher than the curing temperature of approximately 180° C. [356° F.] of a thermally curable epoxy resin that is normally used as the matrix for the fiber-composite material of a helicopter rotor blade. The material of the insulation layer 8 also has sufficient temperature resistance and extensibility, whereby the materials of the first cable core 4 and of the insulation layer 8 can either be the same or else different. All in all, the cable 2 is configured in such a way that it can withstand a thermal load of about 180° C. [356° F.] for at least 10 hours without excessive softening or dimensional changes, said load being of the kind that occurs during the curing of a fiber-composite laminate of the rotor blade.

The ratio of d to D between the diameter d of the first wire 6 and the outer diameter D of the first cable core 4 is about 1:12 in this example.

Figure 3:
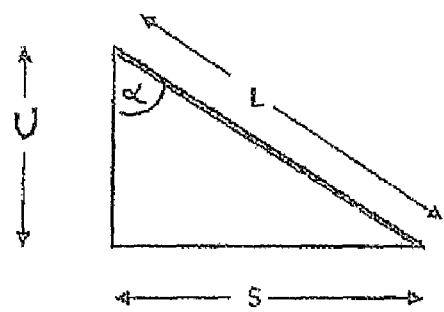
FIG. 3 a diagram to illustrate an important dimensioning criterion for the cable according to the invention.

FIG. 3 shows a diagram to illustrate an important dimensioning criterion for the cable 2 according to the invention. This dimensioning criterion is the maximum permissible strain $\epsilon_L$ of an individual cable wire 6, with the prerequisite that individual cable wires 6 that lie in parallel (here four cable wires 6) are wound onto the cable core 4. The unwinding of a cable wire 6 that is wound in spiral windings around the cable core 4 here shows the geometric relationship illustrated in FIG. 3.

Here, the following abbreviations are used:
U: circumference of the first cable core 4
S: pitch (length of twist) of an individual cable wire 6
D: outer diameter of the first cable core 4
$D_{min}$: smallest permissible outer diameter of the first cable core 4
(the smallest permissible radius of curvature of the cable wire 6 can be obtained from the information provided by the manufacturer)
d: diameter of a cable wire 6
L: length over a cable wire 6 unwound over the length of twist "S"
n: number of cable wires 6 wound in parallel onto the first cable core 4 (here: 4 of them)
$\epsilon_K$: maximum strain of the cable 2 in a laminated fiber-composite component structure
$\epsilon_L$: maximum permissible strain of a cable wire 6, for example, maximum permissible strain at the fatigue strength limit
α: pitch angle of the winding The formula for dimensioning the cable 2 can be derived as shown below. The strain $\epsilon_K$ of the cable 2, as seen over the length of twist S, is:

$$\epsilon_K = \frac{\Delta S}{S} \text{ or } \Delta S = \epsilon_K \cdot S$$

The strain of a cable wire 6 that is wound onto the first cable core 4 is:

$$\epsilon_L = \frac{\Delta S}{L} \epsilon_K \cdot \frac{S}{L}$$

As a result, the following holds true for the dimensioning criterion $\epsilon_L$:

$$\epsilon_L \leq \frac{S}{\sqrt{(D \cdot \pi)^2 + S^2}}$$

The following applies for the pitch angle α of the winding:

$$S/U = \tan \alpha$$

Figure 4:
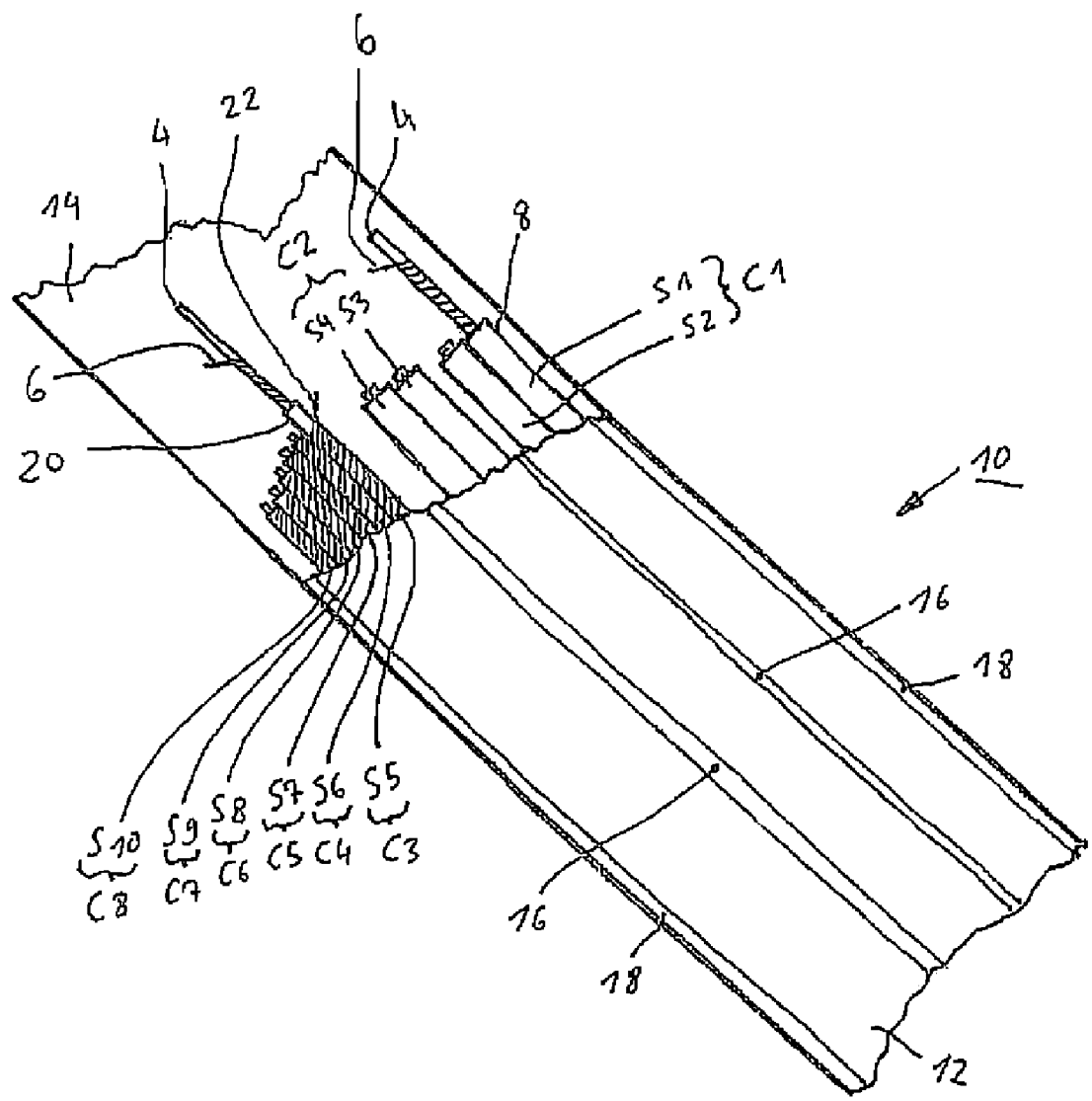
FIG. 4 a schematic top view of a cable according to the invention in a second embodiment.

FIG. 4 shows a schematic top view of a cable 10 according to the invention in a second embodiment. This cable 10 in the form of a flat cable is a highly extensible power and/or signal transmission cable, which has several, that is to say, here ten, cable strands S1 to S10 lying next to each other.

These cable strands S1 to S10 are arranged parallel next to each other between two strip-shaped, film-like support layers 12, 14 made of a plastic material. The support layers 12, 14 have essentially the same extensibility and minimum temperature resistance as the previously described first cable core 4. The four cable strands S1 to S4 each form a two-pole electric power transmission line C1, C2. The remaining six cable strands are six signal transmission lines C3 to C8 each configured as a coaxial line. The two power transmission lines C1, C2 are separated from each other as well as from the signal transmission lines C3 to C8 by a separation area 16 at which the two support layers 12, 14 are joined to each other. Moreover, the support layers 12, 14 are joined to each other at their side edges 18.

The structure of each cable strand S1 to S4 of the 2-pole electric power transmission lines C1, C2 corresponds to that of the cable 2 according to the invention as shown in FIG. 1. The six signal transmission lines C3 to C8 each have an inner first cable core 4 and at least one electrically conductive cable wire 6 wound around the first cable core 4 at a predefined pitch angle, like a spiral and free of crossovers.

A second hollow, electrically insulating cable core 20 made of PTFE is arranged on the first cable wire 6 and it sheathes the first cable wire 6. The extensibility, the temperature resistance and the material properties of the second cable core 20 correspond to those of the first cable core 4. At least one second electrically conductive cable wire 22 is wound around the second cable core 20 at a predefined pitch angle and free of crossovers. This second cable wire 22 serves as shielding for the first cable wire 6. The windings of the first and second cable wires 6, 22 run in opposite directions in this example. In the area of the six signal transmission lines C3 to C8, the two support layers 12, 14 concurrently form an outer insulation layer for the second cable wires 22. The dimensioning criterion described above in conjunction with FIG. 1 and with the first cable wire 6 applies analogously for the second cable wire 22.

Figure 5:
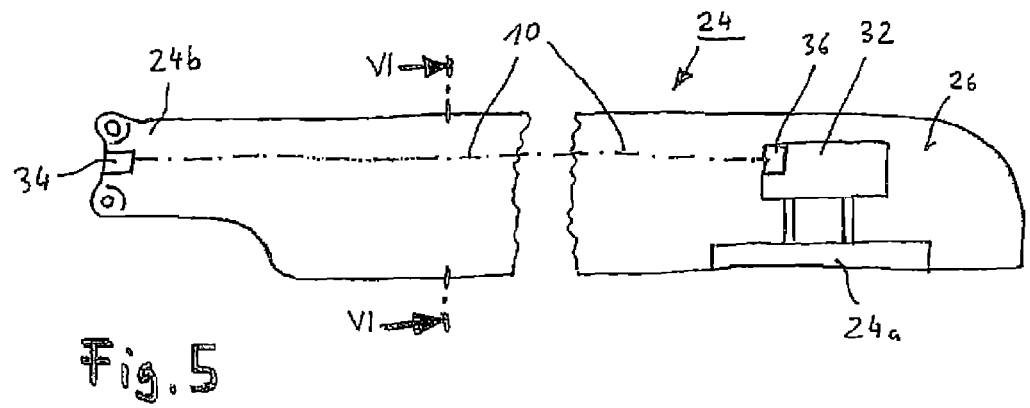
FIG. 5 a schematic top view of a rotor blade according to the invention in a first embodiment.

FIG. 5 shows a schematic top view of a helicopter main rotor blade 24 according to the invention made of fiber-composite material in a first embodiment. Depending on the type of fiber-composite material employed, the fiber-composite material has a modulus of elasticity that lies in a range from approximately 35,000 to 100,000 N/mm².

The rotor blade 24 has a predefined outer contour of the profile (see FIG. 6) and a fiber-composite rotor blade structure with an upper and a lower fiber-composite cover skin 26, 28, as well as a profile core 30 arranged between said skins and made of foam or having a honeycomb structure. Moreover, the rotor blade 24 has a movable rotor blade flap 24a in the vicinity of the tip of the rotor blade. A functional device 32 is built into the rotor blade 24. In this example, the functional device 32 is a flap actuation device having one or more piezoelectric actuators and sensors.

The rotor blade 24 is fitted with a highly extensible cable 10 corresponding to the embodiment of FIG. 4. In FIG. 5, the cable 10 is indicated by a dash-dotted line. This cable 10 is integrated into the fiber-composite rotor blade structure and, starting from a first interface 34 that is located in the vicinity of the rotor blade neck 24b, extends in the direction of the span of the rotor blade 24, essentially in a straight line over almost the entire span of the rotor blade, all the way to a functional device 32 to which it can be connected by means of a second interface 36.

Figure 6:
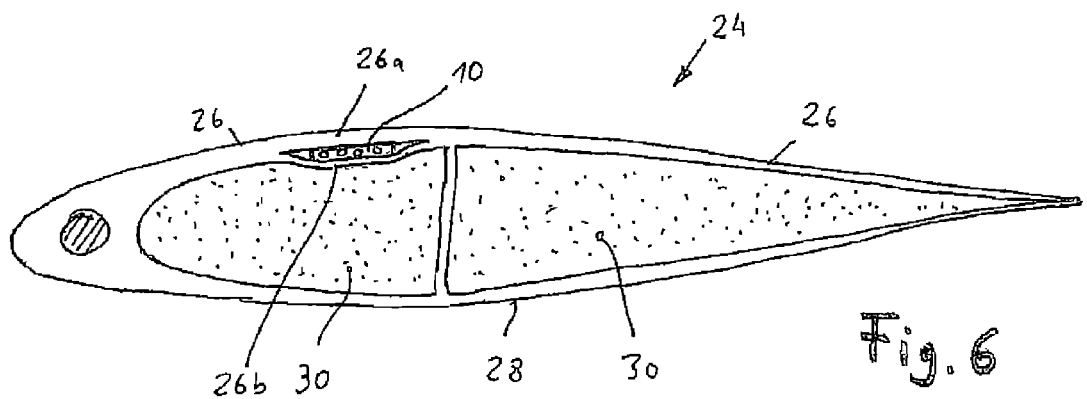
FIG. 6 a schematic cross sectional view of the rotor blade according to the invention along the line VI-VI in FIG. 5.

FIG. 6 shows a schematic cross section of the rotor blade 24 according to the invention along the line VI-VI in FIG. 5. As can be clearly seen in FIG. 6, the cable 10 in this embodiment is arranged on the inside of the upper fiber-composite cover skin 26 facing the profile core 30. The side of the cable 10 facing the profile core 30 is covered by a fiber-composite cover layer 26b joined to the inside of the upper fiber-composite cover skin 26, said fiber-composite cover layer 26b forming part of the upper fiber-composite cover skin at this site. In other words, the upper fiber-composite cover skin 26 is multi-layered and the cable 10 is laminated between two fiber-composite cover skin layers 26a, 26b. In the area of the functional unit 32 (see FIG. 5), the cover layer 26, 28 or the fiber-composite cover skin can have a cutout through which the cable 10 leading to the functional device 32 or to the second interface 36 passes.

The rotor blade 24 is loaded with a centrifugal force of about 1000 grams during the flight operation of the helicopter and this force likewise acts on the cable 10 integrated into the rotor blade 24. In this process, the fiber-composite structure of the rotor blade 24 is reversibly elongated by about 3% in the direction of the span. Therefore, the reversible, fatigue-resistant strain $\epsilon_K$ of the cable 10 in its lengthwise direction is at least this reversible extensibility $\epsilon_L$ of the fiber-composite material of the rotor blade in the direction of its span under said maximum occurring centrifugal force, that is to say, $\epsilon_L \geq 3\%$. A slight deviation from this value is acceptable within the scope of the permissible tolerance ranges. The required value of $\epsilon_L$ is reached by the previously described construction of the employed cable 2 and 10 according to the invention as well as by the fulfillment of the above-mentioned dimensioning criterion.

Figure 7:
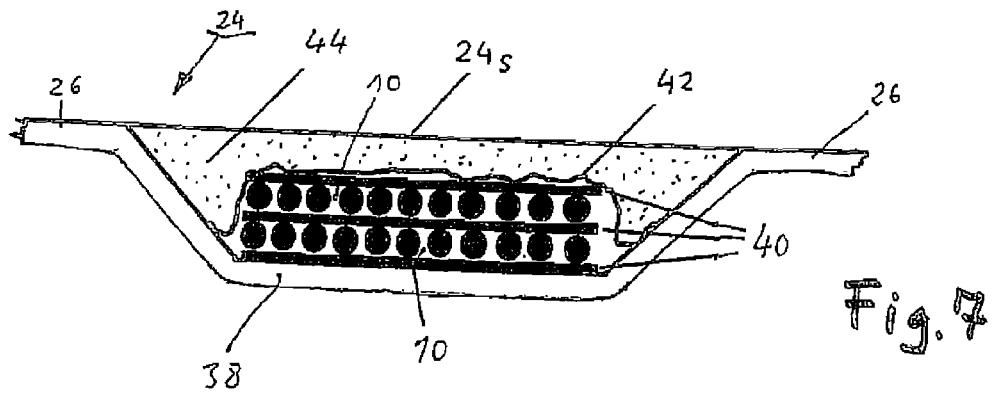
FIG. 7 a schematic cross sectional view of an essential partial area of a rotor blade according to the invention in a second embodiment.

FIG. 7 shows a schematic cross section of an essential partial area of a rotor blade according to the invention in a second embodiment. The rotor blade 24 itself as well as the layout of the cable or cables 10 largely correspond to the embodiment according to FIG. 5. However, two flat cables 10, 10 arranged one above the other are used. In the variant according to FIG. 7, the rotor blade profile also has a cable conduit 38 that extends primarily in the direction of the span of the rotor blade 24, that is accessible from the outside of the profile and that forms part of the fiber-composite rotor blade structure, whereby the cables 10, 10 can be affixed in said cable conduit 38. The cable conduit 38 here is arranged in the area of the upper cover skin 26 and is open towards the top of the rotor blade profile.

The first lower flat cable 10 is affixed in the cable conduit 38 by means of a first strip of double-sided adhesive tape 40 glued onto the bottom of the cable conduit 38. A second strip of double-sided adhesive tape 40, in turn, is glued onto the first flat cable 10. The second flat cable 10 is glued onto the top of this second strip 40. A third strip of double-sided adhesive tape 40 (or alternatively, a one-sided adhesive tape), in turn, is glued onto the top of the second flat cable 10 as an intermediate layer. A layer of cover coating 42 is applied over this. The remaining free space in the cable conduit 38 is filled with a filler paste 44 that serves as a closure element and whose outside is ground neatly and flush with the target outer contour $24_S$ of the rotor blade profile. The outside of the filler paste 44 is advantageously covered with a suitable coating or protective layer. Instead of a double-sided adhesive tape 40, a different suitable adhesive or bonding agent could also be used such as, for instance, at least one layer made of a permanently elastic sealant or the like.

In the variant according to FIG. 7, in case of a failure, the cables 10 can be removed relatively simply and without damage to the fiber-composite structure of the rotor blade 24, after which new cables 10 can be installed.

The invention is not limited to the embodiments above. Within the framework of the protective scope, the cable according to the invention and the rotor blade according to the invention can also assume other embodiments than the ones described concretely above. In particular, the outer insulation layer or the support layer of the cable can have a surface structure that promotes greater adhesion to a fiber-composite and especially to its matrix resin.

The reference numerals in the description and in the drawings serve merely for better understanding of the invention and are not to be construed as limiting the protective scope.

What is claimed is:

1. An extensible cable for transmitting at least one of a power and a signal, comprising:
   at least one cable strand having:
     a first cable core made of an electrically insulating, elastic plastic material; and
     a first cable wire wound around the first cable core at a predefined pitch angle in a spiral and free of crossovers;
     a hollow, electrically insulating second cable core disposed coaxially with the first cable core and sheathing the first cable wire; and
     a second cable wire wound around the second cable core at a predefined pitch angle and free of crossovers.

2. The cable recited in claim 1, further comprising an outer, electrically insulating insulation layer surrounding the first cable wire.

3. The cable as recited in claim 1, wherein a material of at least one of the first and second cable cores is selected from a group of materials consisting of a thermoplastic material, an elastomeric material, a foam, and an electrically non-conductive fiber-composite material.

4. The cable as recited in claim 3, wherein the thermoplastic material includes at least one of polytetrafluoroethylene (PTFE), ethylene-tetrafluoroethylene (ETFE), polyurethane (PUR), and silicone, wherein the thermoplastic material includes at least one of a thermoplastic elastomeric material an elastomeric blend, natural rubber and butadiene rubber, and wherein the fiber-composite material includes a fiberglass-composite material.

5. The cable as recited in claim 1, wherein at least one of the first and second cable wire is selected from the group consisting of an electrically conductive wire, a fiber-optical wire, and a hybrid wire structure having both an electrically conductive wire element and a fiber-optical wire element.

6. The cable as recited in claim 5, wherein the electrically conductive wire includes a metal material, the fiber-optical wire includes a fiberglass wire and wherein the hybrid wire structure includes the electrically conductive wire element and the fiber-optical wire element disposed adjacent to each other.

7. The cable as recited in claim 1, wherein at least one of the first and second cable core has a modulus of elasticity that lies in a range from 200 to 1600 N/mm².

8. The cable as recited in claim 1, wherein at least one of the first and second cable core has a Shore hardness according to ISO 868 that lies in a range from D30 to D90.

9. The cable as recited in claim 1, wherein at least one of the first and second cable core has a Poisson ratio that lies in the range from 0.3 to 0.5.

10. The cable as recited in claim 1, wherein at least one of the first and second cable wire is wound loosely around the respective first or second cable core.

11. The cable as recited in claim 1, further comprising a compressible rubber-elastic layer disposed between the second cable core and the second cable wire, a restoring force of the compressible layer generating a predefined slight pre-tensioning of the second cable wire.

12. The cable as recited in claim 1, wherein at least one of the first and second cable includes a plurality of consecutive windings defining an intermediate space therebetween in a lengthwise direction of the cable.

13. The cable as recited in claim 12, further comprising a rubber-elastic filling material disposed in the intermediate space.

14. The cable according to claim 12, wherein the intermediate space is filled with one of a liquid and a pasty electrically conductive medium.

15. The cable as recited in claim 1, wherein a ratio of a diameter d of one of the first and second cable wire and an outer diameter D of the respective first and second cable core lies in a range from 1:50 to 1:3.

16. The cable as recited in claim 1, wherein at least one of the first and second cable core has one of melting temperature and a glass transition temperature that is higher than a curing temperature of a thermally curable matrix resin of a fiber-composite material.

17. An extensible cable for transmitting at least one of a power and a signal, comprising:
at least one cable strand having:
a first cable core made of an electrically insulating, elastic plastic material; and
a first cable wire wound around the first cable core at a predefined pitch angle in a spiral and free of crossovers, wherein the at least one cable strand includes a plurality of cable strands disposed adjacent to each other and wherein the at least one cable is configured as a flat cable and wherein the plurality of cable strands forms a single layer of cable strands.

18. The cable recited in claim 17, further comprising at least one strip-like, elastic support layer supporting the plurality of cable strands.

19. The cable recited in claim 18, wherein the support layer forms an outer insulation layer of the plurality of cable strands.

20. An extensible cable for transmitting at least one of a power and a signal, comprising:
at least one cable strand having:
a first cable core made of an electrically insulating, elastic plastic material; and
a first cable wire wound around the first cable core at a predefined pitch angle in a spiral and free of crossovers; and
a compressible rubber-elastic layer disposed between the first cable core and the first cable wire, a restoring force of the compressible layer generating a predefined slight pre-tensioning of the first cable wire.

21. A fiber-composite rotor blade having a predefined rotor blade profile with a predefined outer contour of the profile, comprising:
a fiber-composite rotor blade structure having an upper and a lower cover skin and a profile core disposed between them; and
at least one highly extensible cable as recited in claim 1 integrated into the fiber-composite rotor blade structure in a direction of a span of the rotor blade, the cable being connectable to a functional device attachable to the fiber-composite rotor blade structure, wherein a reversible, maximum permissible extensibility $\epsilon_L$ of the cable in a lengthwise direction of the cable is at least as great as a reversible extensibility $\epsilon_{FC}$ of the fiber-composite material of the rotor blade in the direction of the span under a maximum centrifugal force $F_{Cmax}$ predefined by the specific dimensioning.

22. The rotor-blade as recited in claim 21, wherein the rotor blade is for a rotary-wing aircraft.

23. The rotor blade as recited in claim 21, wherein the rotor blade profile has a cable conduit extending substantially in the direction of the span and accessible from outside of the profile and forming part of the fiber-composite rotor blade structure, and wherein the cable is affixable in the conduit.

24. The rotor blade as recited in claim 23, further comprising a closure element configured to close the cable conduit flush with the outer contour of the profile.

25. The rotor blade as recited in claim 24, wherein the closure element is selected from the group of closure elements consisting of a cover; a cover flap, a filling compound and a foam material.

26. The rotor blade as recited in claim 21, wherein the cover skin is multi-layered and the cable is laminated between two cover skin layers.

27. The rotor blade as recited in claim 21, wherein the cable is arranged on the inside of the cover skin facing a core of the profile.

28. The rotor blade as recited in claim 27, wherein a side of the cable facing the profile core is covered by a fiber-composite cover layer is joined to an inside of the cover skin.

29. The rotor blade as recited in claim 24, wherein the cable is fastened to at least one of the fiber-composite rotor blade structure and the closure element by means of one of an adhesive and a double-sided tape.

30. The rotor blade as recited in claim 21, wherein the cable is disposed essentially in a straight line in the direction of the span of the rotor blade.

31. The rotor blade as recited in claim 21, wherein the cable is disposed in a meander-like or wavy pattern extending in the direction of the span of the rotor blade.

* * * * *